Patented Apr. 14, 1942

2,279,882

UNITED STATES PATENT OFFICE 2,279,882

INTERPOLYMERS OF DI-(METHOXY-ETHYL) ITACONATE AND ETHYL METHACRYLATE

Gaetano F. D'Alelio, Pittsfield, Mass., assignor to General Electric Company, a corporation of New York No Drawing. Application September 12, 1939, Serial No. 294,494

2 Claims. (Cl. 260—78)

This invention relates to the production of new materials having valuable and characteristic properties that make them especially suitable for use in industry, for example in molding, casting, laminating, coating and adhesive applications and for other purposes. The invention is concerned more particularly with compositions of matter comprising an interpolymer of an itaconic ester of a substituted monohydric alcohol (a polyhydric alcohol in which all but one of the hydroxyl radicals have been replaced by a substituent group or groups) and, in addition to said ester, at least one other polymerizable compound containing the structure $$-CH=C\Big\langle$$

more particularly a

 grouping

Specifically the invention is concerned with a composition comprising the product of polymerization of a mixture containing di-(methoxyethyl) itaconate and ethyl methacrylate in the ratio of 20 parts of the former to 80 parts of the latter, said polymerization product being hard, clear and colorless and having a higher flexural strength than the ethyl methacrylate when polymerized alone under similar conditions.

The new esters prepared and used in practicing this invention may be defined as itaconic esters in which at least one ester group is derived from a polyhydric alcohol in which all but one hydroxyl group has been replaced by a substituent group. Examples of such esters are

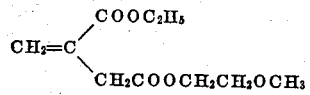

which is ethyl beta methoxy ethyl itaconate;

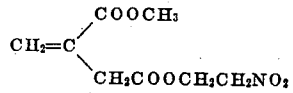

which is methyl beta nitro ethyl itaconate; and

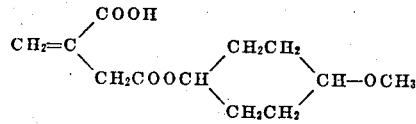

which is mono para methoxy- cyclohexyl itaconate. It will be noted that the first two esters are mixed esters. The preparation of mixed esters is in general somewhat difficult and complicated, involving extensive processing and high cost. The mono esters are not difficult to make but no particular advantages ordinarily accrue from their use in the production of interpolymers. Hence the preferred embodiment of this invention comprises the preparation and utilization of itaconic esters in which both groups are identical (symmetrical diesters). Illustrative of such esters are di-(methoxy ethyl) itaconate, di-(ethoxy ethyl) itaconate, di-(propoxy ethyl) itaconate, di-(butoxy ethyl) itaconate, di-(beta chloro ethyl) itaconate, di-(beta bromo propyl) itaconate, di-(beta acetoxy ethyl) itaconate, di-(beta methoxy propyl) itaconate, di-(beta nitro ethyl) itaconate, di-(beta dimethyl amino ethyl) itaconate, di-(phenoxy ethyl) itaconate, di-(beta alloxy ethyl) itaconate, di-(beta methalloxy ethyl) itaconate, etc. The substituted monohydric alcohol itaconic diesters of this invention may be graphically expressed by the formula $$\begin{array}{c} CH_2=C-COOR \\ | \\ CH_2COOR' \end{array}$$

where R and R' are the same or different (preferably the same) ester radicals derived from a polyhydric alcohol in which all but one of the hydroxyls have been replaced by a substituent group or groups.

The substituted monohydric alcohols used in preparing the esters of this invention may be considered as derived from polyhydric alcohols in which all but one of the hydroxy groups have been replaced by a substituent group such as an ether radical, an organic or inorganic ester radical, an amine radical, etc. They also may be described as monohydric alcohols in which at least one carbon atom is attached to a non-hydrocarbon atom or radical.

Illustrative of the substituted monohydric alcohols which may be used in the preparation of the esters of this invention are:

HOCH₂CH₂OCH₃, ethylene glycol monomethyl ether
HOCH₂CH₂OC₂H₅, ethylene glycol monoethyl ether
HOCH₂CH₂OC₃H₇, ethylene glycol monopropyl ether
HOCH₂CH₂OC₄H₉, ethylene glycol monobutyl ether
HOCH₂CH₂Cl, ethylene chlorohydrin
HOCH₂CH₂Br, ethylene bromohydrin
HOCH₂CH₂OCOCH₃, ethylene glycol monoacetate HOCH₂CH₂OCOC₂H₅, ethylene glycol monopropionate
HOCH₂CH₂OCOCH=CH₂, ethylene glycol monoacrylate HOCH₂CH₂OCOC=CH₂, ethylene glycol monomethacrylate
          |
          CH₃

HOCH₂CH₂OCOC₆H₅, ethylene glycol monobenzoate
HOCH₂CH₂OCH=CH₂, ethylene glycol monovinyl ether
HOCH₂CH₂OCH₂CH=CH₂, ethylene glycol monoallyl ether HOCH₂CH₂OCH₂C=CH₂, ethyleneglycol monomethallyl ether
           |
           CH₃

HOCH₂CH₂NO₂, beta nitro ethanol
HOCH₂CH₂CN, ethylene cyanohydrin
HOCH₂CH₂NH₂.HCl, beta aminoethanol hydrochloride
HOCH₂CH₂N(CH₃)₂, beta dimethyl amino ethanol
HOCH₂CH₂N(CH₃)₂.HBr, beta dimethyl amino ethanol hydrobromide
HOCH₂COCH₃, hydroxy acetone
HOCH₂CH₂COCH₃, beta hydroxy methyl ethyl ketone
HOCH₂CH₂OC₆H₅, ethylene glycol monophenyl ether
HOCH₂CH₂COOC₂H₅, ethyl hydracrylic ester
HOCH₂CH₂SCH₂CH₃, ethylene glycol monoethyl thioether
HOCH₂CH₂OCH₂CH₂OCH₃, diethylene glycol monomethyl ether
HOCH₂CH₂OCH₂CH₂OC₂H₅, diethylene glycol monoethyl ether
HOCH₂CH₂OCH₂CH₂OC₄H₉, diethylene glycol monobutyl ether
HOCH₂CH₂OCH₂CH₂OOC—CH₃, diethylene glycol monoacetate HOCH₂—CH—CH₃, 2-methoxy-1-propanol
      |
    OCH₃

HOCH₂—CH—CH₃, 2-ethoxy-1-propanol
      |
    OC₂H₅

HOCH₂—CH—CH₃, 2-butoxy-1-propanol
      |
    OC₄H₉

HOCH₂CHBrCH₃, 2-bromo-1-propanol
BrCH₂CHOHCH₃, 1-bromo-2-propanol
HOCH₂CH₂CH₂OCH₃, trimethylene glycol monomethyl ether
HOCH₂CH₂CH₂Cl, gamma chloro-1-propanol NO₂
      |
HOCH₂—C—CH₃, 2-nitro-2-methyl-1-propanol
      |
      CH₃ etc.

In contrast to the previously known polymeric methyl, ethyl and optically active amyl esters of itaconic acid, which esters are reported as being hard, brittle masses, many of the polymerized esters of this invention, for example polymerized di-(methoxyethyl) itaconate, are of a rubbery nature. Others, such as itaconates of vinyl and allyl ether alcohols are insoluble infusible masses when polymerized. The prior known itaconic esters had an open chain aliphatic carbon structure in the ester grouping, and it was unpredictable as to the nature of the properties of the product that would be obtained by interrupting a carbon chain by a non-carbon atom or radical.

The normal and isomeric itaconic esters of this invention may be polymerized separately, or mixed with each other, or mixed with other polymerizable material. The homogeneous and heterogeneous polymers vary from viscous masses to rubbery and hard, solid bodies, depending upon the extent of polymerization and the particular polymerizable or other modifying agent, if any, which is incorporated therewith. Heat, light, or heat and light may be used to effect polymerization, although under such conditions the rate of polymerization is relatively slow. Hence, to accelerate the polymerization, I prefer to use a catalyst, accompanied by heat, light, or heat and light. Examples of catalysts which may be used are oxygen, ozone, hydrogen peroxide, sulfuric acid, aluminum chloride, boron fluoride, superoxides such as aliphatic acyl peroxides, e. g., acetyl peroxide, stearyl peroxide, etc., peroxides of the aromatic acid series, e. g., benzoyl peroxide. Benzoyl peroxide is the preferred catalyst because of its ease of handling, its relative freedom from explosive hazards and its ready solubility in the monomeric or partially polymerized itaconic esters. The rate of polymerization is a function of the temperature and may be carried out at from room temperature (20°–30° C.) to temperatures materially above 100° C., for example about 130° C.

The itaconic esters of this invention when polymerized alone form thermoplastic materials, that is, materials the shape of which easily can be changed by heat. The softening point, solubility and other properties of these itaconic esters depend upon the number of carbon atoms in, and the structure of, the ester chain. In general, the longer the ester chain, the lower is the softening point of the polymer. Some of the completely polymerized esters are clear, colorless, rubbery, ductile bodies. Others are soft, free-flowing, viscous masses at temperatures of about 100° C., yet highly viscous or soft, slightly mobile masses at room temperature. Some possess properties intermediate brittle solids and dense, mobile, viscous masses. Still others are insoluble, infusible masses.

In many applications the normally viscous, mobile polymers of high plastic flow are exceptionally valuable, particularly where non-volatilizing materials that can accommodate themselves to the form of the container are required. Particularly are they valuable when used alone, or when dissolved or dispersed in other dielectric materials including a liquid hydrocarbon such as mineral oil. This property of high plastic flow can be used to great commercial advantage in molding processes by interpolymerizing these monomers with other bodies of low plastic flow, thereby imparting the desired flow characteristics to the end-product.

In other cases, for example where it is desired to raise the softening point, to decrease the brittleness and the solubility, or to produce insoluble, infusible products, this may be done by copolymerizing a selected monomeric or partially polymerized ester of this invention with polymerizable unsaturated materials in monomeric or partially polymerized state, for example an ester of a polybasic acid in which at least two ester groups each contain an unsaturated hydrocarbon radical; more particularly a

CH₂=C radical such as vinyl, allyl, methallyl, etc. Also, copolymers of valuable properties may be obtained by copolymerizing these esters derived from substituted monohydric alcohols and itaconic acid with other monomeric or partly polymerized itaconic esters, for example, dimethyl itaconate, diethyl itaconate, itaconic esters of unsaturated alcohols for instance diallyl itaconate, etc., vinyl and allyl esters of saturated and unsaturated mono- and poly-carboxylic acids, more particularly polymerizable materials containing a

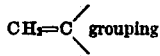

for instance monomeric or partly polymerized styrene, vinyl esters such as the acetate, chloride, bromide, fluoride, etc., vinyl ketones, methvinyl ketones, vinylidene halides as the chloride, bromide and fluoride, acrylic and methacrylic esters, e. g., methyl acrylate, ethyl acrylate, propyl acrylate, butyl acrylate, methyl methacrylate, ethyl methacrylate, propyl methacrylate, butyl methacrylate, etc.

As illustrative of the differences in properties resulting from interpolymerizing the itaconic esters of this invention with other polymerizable materials, the following is mentioned:

Di-(ethoxy ethyl) itaconate was treated with 1% by weight benzoyl peroxide at 85° C. for 64 hours to give a clear, colorless, sticky polymer; but when 25 parts di-(ethoxy ethyl) itaconate were copolymerized under the same conditions with 75 parts vinyl acetate and 0.5 part diallyl itaconate, a hard, clear, colorless copolymer was obtained.

As further illustrative of the differences in the copolymerization processes with which this invention is concerned, the following is mentioned:

A mixture of 20 parts di-(methoxyethyl) itaconate and 80 parts ethyl methacrylate was copolymerized in the presence of 0.5 part benzoyl peroxide for 24 hours at 55° C. and for 72 hours at 85° C., yielding a hard, clear, colorless copolymer. This copolymer was sufficiently ductile that it could not be broken in a flexural strength test and had an impact strength (Dynstat) of 0.1 foot pound. Ethyl methacrylate, polymerized alone under similar conditions, had a flexural strength of 7450 pounds per square inch and an impact strength of 0.13 foot pound. Even when, for example, 0.3 part diallyl itaconate was incorporated with methoxyethyl itaconate and ethyl methacrylate in the production of a solvent-resistant copolymer, the above-described ductility was still maintained.

A copolymer prepared from 20 parts di-(ethoxyethyl) itaconate and 80 parts ethyl methacrylate was likewise ductile and had an impact strength of 0.143 foot pound.

Various methods may be used to prepare the esters with which this invention is concerned. For example, they may be prepared by ester exchange reactions in the presence of a suitable inhibiting agent, such as phenolic bodies, and a suitable catalyst, the reaction proceeding as in an alcoholysis. Thus, in the preparation of, for instance, di-(methoxy ethyl) itaconate, the reactants may comprise monomethyl glycol ether, dimethyl or diethyl itaconate, hydroquinone as an inhibiting agent and a catalyst such as metallic sodium, potassium carbonate, sulfuric acid, etc. The esters of this invention also may be prepared from itaconic nitrile by causing to react therewith an alcohol, corresponding to the ester desired, in the presence of water and an inorganic acid. Or, they may be made from itaconyl chloride and a selected alcohol, or by decomposition of a corresponding ester of citric or citraconic acids or one of their derivatives.

A preferred method of preparation is by direct esterification of itaconic acid with the selected alcohol in the presence of an esterification catalyst, with or without the presence of other unreactive bodies to remove the water resulting from esterification. This method may be carried out continuously.

Mixed esters of this invention, that is, itaconic esters in which both ester groups are different, also may be prepared in various ways. Illustrative of such esters are methyl methoxyethyl, ethyl ethoxyethyl, propyl ethoxyethyl, butyl methoxyethyl itaconates. These mixed esters may be prepared, for instance, by effecting reaction between itaconic monoester acid chloride and a selected alcohol in the presence or absence of an inhibiting agent such as phenolic bodies, copper, etc. They also may be made by ester exchange reactions in the presence of a suitable catalyst, using an ester of a lower boiling alcohol, such as dimethyl or diethyl itaconate, and an alcohol corresponding to the ester desired.

Another method of preparation of these mixed esters is from itaconic monoacid chloride and a selected alcohol, followed by direct esterification of the other acid radical by another alcohol. These mixed esters also may be made by direct consecutive esterification of each of the carboxyl groups with different alcohols, or by treating itaconic diacid chloride first with one alcohol, then with another. They also may be prepared by saponification of one group of an itaconic di-ester with alcoholic potassium hydroxide in the cold and either isolating the monoacid from the potassium salt for further reaction with the selected alcohol or causing the potassium salt to react directly with an alkyl sulfate corresponding to the ester desired.

In order that those skilled in the art better may understand how the present invention may be carried into effect, the following illustrative examples are given of the preparation of these new esters and of various compositions comprising the same. All parts are by weight.

*Preparation of di-(methoxy ethyl) itaconate*

A solution of 98.8 parts glycol monomethyl ether, 65 parts itaconic acid, 1.36 parts concentrated sulfuric acid and 105 parts benzene were subjected to reaction in a continuous esterification apparatus until no more water of reaction was collected. The cold solution was made neutral with 10% aqueous sodium carbonate, washed with distilled water and distilled. The benzene solution of the ester was distilled under vacuum. Di-methoxyethyl) itaconate was obtained as a fraction boiling at 125°–135° C. at 1 mm. pressure. When polymerized with 1% benzoyl peroxide at 85° C. for 64 hours a clear, colorless, rubbery polymer was obtained.

In a similar manner di-(ethoxyethyl) itaconate boiling at 143°–149° C. at about 1 mm. pressure, was prepared. This ester was a clear, water-white liquid. Treatment with 1% benzoyl peroxide at 100° C. for 48 hours gave a clear colorless, soft, sticky polymer. Illustrative of other itaconates of this invention is di-(butoxyethyl) itaconate, boiling at 155°–165° C. at about 1 mm. pressure. This itaconate polymerized at 85° C. in the presence of benzoyl peroxide into a viscous material. Another example is di-(gamma bromopropyl) itaconate, which boils at 170°–210° C. at about 2 mm. pressure.

The following examples are illustrative of the production of interpolymers of this invention. All parts are by weight. Polymerization was effected by heating the material in the presence of the amount of benzoyl peroxide and at the temperature stated below. Unless otherwise designated the components of the initial mixture were in monomeric form. These ratios are used only as illustrations and may be varied, as will be understood by those skilled in the art, over a wide range of proportions.

Example 1

|  | Parts |
|---|---|
| Di-(methoxyethyl) itaconate | 50 |
| Vinyl acetate | 50 | were treated with 1% benzoyl peroxide at 70° C. for 15 hours, giving a clear, rubber-like, resinous copolymer. On the other hand, when

|  | Parts |
|---|---|
| Di-(methoxyethyl) itaconate | 50 |
| Methyl methacrylate | 50 | were treated with 1% benzoyl peroxide at 70° for 96 hours, a much harder, colorless, rubbery copolymer was obtained.

Example 2

The following two-component mixtures were treated with 0.5% benzoyl peroxide at 55° C. for 24 hours and at 85° C. for 72 hours to give the copolymers tabulated below.

|  | Components | Characteristics of copolymer |
|---|---|---|
| (a) | 40 parts di-(methoxyethyl) itaconate<br>60 parts methyl methacrylate | Hard, clear, colorless. |
| (b) | 40 parts di-(ethoxyethyl) itaconate<br>60 parts methyl methacrylate | Do. |
| (c) | 40 parts di-(butoxyethyl) itaconate<br>60 parts methyl methacrylate | Clear, rubbery. |
| (d) | 20 parts di-(methoxyethyl) itaconate<br>80 parts ethyl methacrylate | Hard, clear, colorless. |
| (e) | 20 parts di-(ethoxyethyl) itaconate<br>80 parts ethyl methacrylate | Do. |
| (f) | 20 parts di-(butoxyethyl) itaconate<br>80 parts ethyl methacrylate | Clear, rubbery. |
| (g) | 10 parts di-(butoxyethyl) itaconate<br>20 parts methyl itaconate<br>70 parts ethyl methacrylate | Clear, hard, colorless. |
| (h) | 25 parts di-(methoxyethyl) itaconate<br>75 parts vinyl acetate | Hard, clear, colorless. |
| (i) | 25 parts di-(ethoxyethyl) itaconate<br>75 parts vinyl acetate | Clear, hard, colorless. |
| (j) | 25 parts di-(butoxyethyl) itaconate<br>75 parts vinyl acetate | Clear, rubbery. |
| (k) | 20 parts di-(methoxyethyl) itaconate<br>80 parts ethyl acrylate | Clear, very soft. |
| (l) | 20 parts di-(ethoxyethyl) itaconate<br>80 parts ethyl acrylate | Clear, rubbery. |
| (m) | 20 parts di-(butoxyethyl) itaconate<br>80 parts ethyl acrylate | Clear, very soft. |

Example 3

The following three-component systems were treated similarly to those of Example 2 and resulted in products somewhat harder than those of that example.

|  | Components | Characteristics of copolymer |
|---|---|---|
| (a) | 10 parts di-(ethoxyethyl) itaconate<br>10 parts dimethyl itaconate<br>80 parts ethyl methacrylate | Clear, hard, colorless. |
| (b) | 10 parts di-(methoxyethyl) itaconate<br>10 parts dimethyl itaconate<br>80 parts ethyl methacrylate | Clear, colorless, very hard. |
| (c) | 10 parts di-(butoxyethyl) itaconate<br>20 parts dimethyl itaconate<br>70 parts ethyl methacrylate | Clear, hard, colorless. |

Example 4

The following multi-component systems were treated similarly to those of Examples 2 and 3. The product possesses superior solvent resistance to those of Example 2.

|  | Components | Characteristics of copolymer |
|---|---|---|
| (a) | 50 parts di-(methoxyethyl) itaconate<br>50 parts methyl methacrylate<br>0.2 part diallyl itaconate | Clear, colorless, very hard. |
| (b) | 50 parts di-(ethoxyethyl) itaconate<br>50 parts methyl methacrylate<br>0.2 part diallyl itaconate | Clear, very hard, colorless. |
| (c) | 50 parts di-(butoxyethyl) itaconate<br>50 parts methyl methacrylate<br>0.2 part diallyl itaconate | Rubbery, clear, colorless. |
| (d) | 20 parts di-(methoxyethyl) itaconate<br>80 parts ethyl methacrylate<br>0.3 part diallyl itaconate | Clear, hard, colorless. |
| (e) | 20 parts di-(ethoxyethyl) itaconate<br>80 parts ethyl methacrylate<br>0.3 part diallyl itaconate | Do. |
| (f) | 20 parts di-(butoxyethyl) itaconate<br>80 parts ethyl methacrylate<br>0.3 part diallyl itaconate | Do. |
| (g) | 10 parts di-(ethoxymethyl) itaconate<br>10 parts dimethyl itaconate<br>80 parts ethyl methacrylate<br>0.1 part diallyl itaconate | Do. |
| (h) | 25 parts di-(methoxyethyl) itaconate<br>75 parts vinyl acetate<br>0.5 part diallyl itaconate | Do. |
| (i) | 25 parts di-(ethoxyethyl) itaconate<br>75 parts vinyl acetate<br>0.5 part diallyl itaconate | Do. |
| (j) | 25 parts di-(butoxyethyl) itaconate<br>75 parts vinyl acetate<br>0.5 part diallyl itaconate | Do. |
| (k) | 10 parts di-(methoxyethyl) itaconate<br>10 parts dimethyl itaconate<br>80 parts ethyl methacrylate<br>0.1 part diallyl itaconate | Do. |
| (l) | 20 parts di-(methoxyethyl) itaconate<br>80 parts ethyl acrylate<br>0.5 part diallyl itaconate | Clear, rubbery. |
| (m) | 20 parts di-(ethoxyethyl) itaconate<br>80 parts ethyl acrylate<br>0.5 part diallyl itaconate | Do. |
| (n) | 20 parts di-(butoxyethyl) itaconate<br>80 parts ethyl acrylate<br>0.5 part diallyl itaconate | Do. |
| (o) | 10 parts di-(ethoxyethyl) itaconate<br>10 parts methyl itaconate<br>80 parts ethyl acrylate<br>0.1 part diallyl itaconate | Do. |

The diallyl itaconate of Example 4 may be increased or may be replaced in whole or in part by substances such, for instance, as allyl and methallyl esters of polybasic acids, for example by diallyl carbonate, diallyl oxalate, diallyl malonate, diallyl succinate, diallyl glutarate, diallyl adipate, diallyl pimelate, diallyl suberate, diallyl azelaate, diallyl sebacate, diallyl alpha dimethyl malonate, diallyl alpha allyl malonate, diallyl maleate, diallyl fumerate, diallyl phthalate, diallyl tartrate, triallyl citrate, triallyl carballylate, diallyl citraconate, diallyl mesaconate, diallyl glutaconate, diallyl hydromucate, diallyl glutinate, tetra-allyl symmetrical ethane tetracarboxylate, etc.; polyhydric alcohol and unsaturated alcohol esters of acrylic and methacrylic acids, for example glycol acrylate, glycol dimethacrylate, allyl acrylate, allyl methacrylate, methallyl acrylate, methallyl methacrylate, etc.; or by mixtures of such substances.

The itaconic esters of this invention, as well as the interpolymers obtained by copolymerizing these esters with other polymerizable bodies have a wide range of properties. Their hardness and solubilities may be varied over a considerable range from fluid compositions of varied intrinsic viscosity or soft, flexible bodies to hard, rigid masses that can be swelled or dissolved in many volatile and non-volatile solvents, even those of a hydrocarbon nature. By suitable selection of the starting monomeric or partly polymerized materials, interpolymers can be obtained in an insoluble, infusible state practically resistant to the destructive effect of other chemical bodies such as acids, bases, solvents and the like.

When a plasticizing effect is desired in some other synthetic or natural plastic or potentially plastic material, the itaconic esters of this invention are particularly suited for that purpose. High molecular weight bodies, such as polyvinyl chloride, cellulose esters such as the acetate, propionate, butyrate, etc., cellulose ethers such as methyl cellulose, ethyl cellulose, benzyl cellulose, etc., polymerized methyl methacrylate, polystyrene, etc., may be plasticized by incorporating therewith itaconic esters of this invention in a monomeric, partially polymerized or completely polymerized state, in the presence or absence of a catalyst such as benzoyl peroxide when the monomeric or partially polymerized forms are used. These itaconic esters may be incorporated into the high molecular weight body by simple mechanical agitation or by the use of mutual solvents, followed by the standard mechanical processes known to the plastics art. These bodies then may be subjected to further heat and pressure treatment if desired.

The esters of this invention may be converted to polymers or interpolymers in molds with or without the application of pressure, in the presence or absence of a material which is a solvent for the monomer but not for the polymer, or one which is a solvent for both monomer or polymer, or one which is not a solvent for either the monomer or polymer so that spongy or granulated polymeric modifications are obtained.

The solid, thermoplastic polymers and copolymers of this invention, with or without modifying agents, may be used in injection, compression, or transfer molding processes to make numerous articles for industrial, technical and novelty use and other applications.

As modifying agents various fillers may be used, for example, wood flour, alpha flock, sand, asbestos, mica, paper, cloth, cellulose derivatives such as cellulose itself, regenerated cellulose, cellulose esters, cellulose ethers, natural and synthetic filaments or fibers, etc., in continuous, shredded, or comminuted form. Pigments, dyes, opacifiers, plasticizing substances, such as dibutyl phthalate, esters of monobasic and polybasic saturated and unsaturated acids, esters of aromatic monobasic and polybasic acids, etc., may be incorporated into the polymers and copolymers of this invention to modify the same. Synthetic and natural resins, gums, oils, waxes, polyhalogenated aromatic derivatives, etc., likewise may be added as modifying agents.

In solvents, or without solvent utilizing a melt process, the fusible polymers may be used in adhesive and laminating applications, to bond paper, wood, mica flakes, glass sheets, rubber sheets, etc., fibrous materials such as silk, asbestos, glass fibers, synthetic fibers in filament, thread or fabric (woven or felted) form, cellulose derivatives in comminuted, sheet or fibrous form, etc. In the form of liquid coating compositions such as lacquers, enamels, varnishes, etc., they find application in surface protective coatings, such as for walls, desks, wire, concrete, porcelains, etc. In a flowable condition without the use of solvents they may be used as impregnants for many porous bodies, such as cork, pottery, felts, or fabricated bodies with interstices, such as the windings of electrical coils, netted fiber, interwoven fibrous materials, etc.

When the monomers of this invention are copolymerized with, for example, diallyl itaconate in the presence of another non-polymerizable body which acts as a solvent for these monomers, there results a homogeneous gelled material which firmly binds the solvent so as to reduce to a minimum evaporation losses of the solvent. Illustrative of non-polymerizable bodies which thus may be gelled are butyl alcohol, benzene, ethylene dichloride, the monohalogenated aromatic hydrocarbons or mixtures of halogenated aromatic hydrocarbons, ethylene glycol, mineral oils including lubricating oils, etc.

What I claim as new and desire to secure by Letters Patent of the United States is:

1. A product of polymerization of a mixture containing di-(methoxyethyl) itaconate and ethyl methacrylate in the ratio of 20 parts of the former to 80 parts of the latter, said polymerization product being hard, clear and colorless and having a higher flexural strength than ethyl methacrylate when polymerized alone under similar conditions.

2. The method of producing a clear, hard, colorless interpolymer having a higher flexural strength than polymeric ethyl methacrylate which comprises forming a mixture containing monomeric ethyl methacrylate and di-(methoxyethyl) itaconate in the ratio of 80 parts of the former to 20 parts of the latter and, in addition to said monomers, a small amount of a polymerization catalyst, and heating the said mixture to produce a solid interpolymerization product.

GAETANO F. D'ALELIO.